Figure 1A:
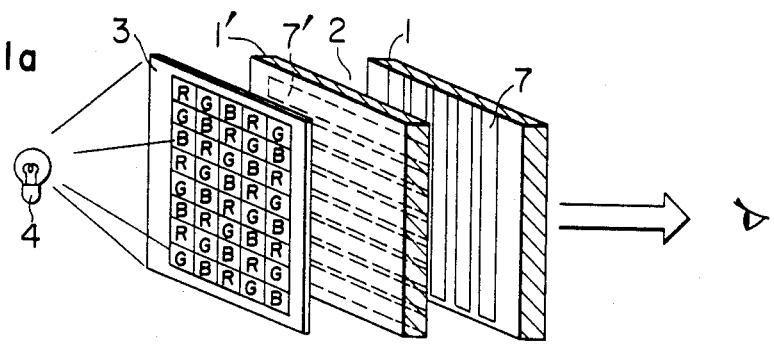

United States Patent [19]

Mukoh et al.

[11] 4,396,251

[45] Aug. 2, 1983

[54] PLEOCHROIC COLOR DISPLAY DEVICE

[75] Inventors: Akio Mukoh; Fumio Nakano, both of Hitachi; Hideaki Kawakami, Mito; Hirosada Morishita; Mikio Sato, both of Hitachi; Hidetoshi Abe, Katsuta; Shuji Imazeki, Hitachi, all of Japan

[73] Assignee: Hitachi, Ltd., Tokyo, Japan

[21] Appl. No.: 125,478

[22] Filed: Feb. 28, 1980

[30] Foreign Application Priority Data

Mar. 5, 1979 [JP]  Japan .................... 54-24481

[51] Int. Cl.³ .............................................. G02F 1/13
[52] U.S. Cl. ...................... 350/349; 350/339 F
[58] Field of Search .............. 350/339 F, 345, 349

[56]  References Cited

U.S. PATENT DOCUMENTS 3,840,695 10/1974 Fischer ...................... 350/345 X
3,900,248  8/1975 Nagasaki ...................... 350/349 X
4,029,392  6/1977 Moriyama et al. ................. 350/349
4,035,060  7/1977 Tsunoda et al. ............. 350/339 F X
4,257,682  3/1981 Suzuki et al. .................... 350/349
4,294,524 10/1981 Stolov ....................... 350/339 F X Primary Examiner—F. L. Evans
Attorney, Agent, or Firm—Antonelli, Terry & Wands

[57]  ABSTRACT

A pleochroic color display device is provided which comprises a layer of guest-host type liquid crystal sandwiched between two transparent electrodes for driving the liquid crystal, the guest-host liquid crystal containing a dichroic dye as guest material, and a color filter disposed in front or rear of the layer of the guest-host type liquid crystal. High contrast pleochroic color displays can be obtained by selecting a blackish dye as the dichroic dye. Dichroic displays other than white ones can be produced by the use of a single liquid crystal cell and a single color filter (with one color).

8 Claims, 3 Drawing Figures

PLEOCHROIC COLOR DISPLAY DEVICE

This invention relates to a pleochroic color display device using a guest-host type liquid crystal.

As a conventional pleochroic color liquid crystal display device is known a liquid crystal color display system which uses a liquid crystal as host material and a dichroic dye as guest material so that a color display may be effected by the guest material. Most of such conventional systems employ a negative display (white on color) and a system is also known which uses a plurality of above dichroic color display devices piled one upon another to effect a pleochroic color display or more than three colors (cf. U.S. Pat. No. 3,703,329). However, the pile of the plural devices are too complex to drive, and degrades the extent of light penetrating them. This lowers the contrast of display.

Moreover, there has been also proposed a display system which uses in combination a color filter having color materials of more than two colors disposed in stripe or mosaic configuration on a substrate and liquid crystal devices capable of being actuated corresponding to the respective stripes or mosaic pieces, and which performs a color display by turning on and off the liquid crystal devices in response to external signals (cf. Japanese Patent Kokai (Laid-Open) No. 80799/75). This system, however, is not only small view angle but completely prevent color leaks. Namely, in this system, color leaks occur even in deenergized devices so that the resultant display has an insufficient contrast, especially, in case of matrix driving.

One object of this invention is to provide a new pleochroic color display device.

Another object of this invention is to provide a pleochroic color display device having a high contrast in display.

According to this invention, which has been made to attain the above objects, there is provided a pleochroic color display device comprising a liquid crystal layer sandwiched between two substrates having thereon transparent electrodes for driving the liquid crystal in response to external signals and a color filter disposed in front or rear of the liquid crystal layer, wherein the liquid crystal is a guest-host type liquid crystal containing dichroic dye as a guest material.

Figure 1B:
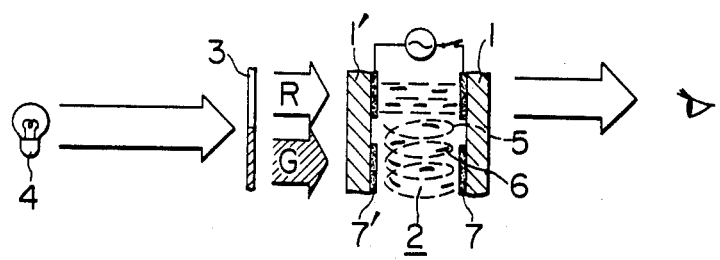
Figure 2:
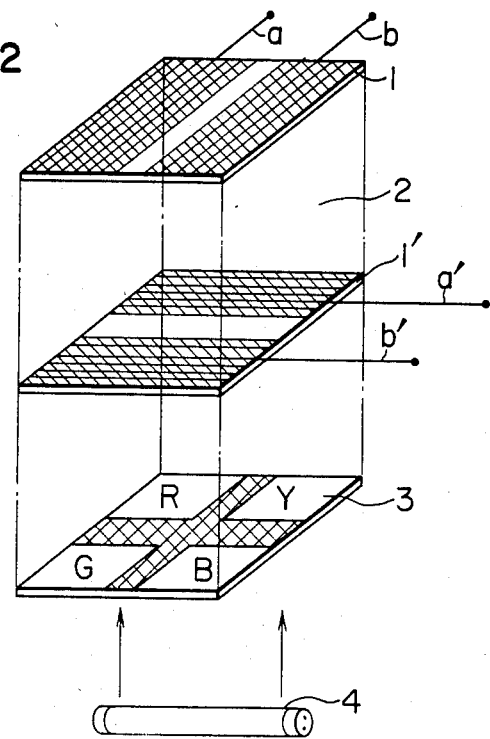

Other objects, features and advantages of this invention will be apparent when one reads the following description of the invention in conjunction with the attached drawings in which:

FIGS. 1a and 1b show respectively in perspective and cross-sectional views the mechanism of a color display device as one embodiment of this invention; and FIG. 2 shows in perspective view the mechanism of a color display device as another embodiment of this invention.

Now, an example of three-color display will be described with the aid of the attached drawings.

FIGS. 1a and 1b schematically show the structure and mechanism of a matrix type display device as an embodiment of this invention. Between transparent substrates 1 and 1' having matrix electrodes 7, 7' thereon is sandwiched a layer of liquid crystal 5 as host containing dichroic dye 6 as guest. When the matrix electrodes are energized, the corresponding parts of the liquid crystal are driven. A color filter 3 is also provided, corresponding to the patterns of the matrix electrodes 7, 7', in rear or front of the liquid crystal layer 5.

A color display of any arbitrary pattern can be effected by sending through the color filter 3 the light from a light source 4 placed behind the color filter 3 and by selectively passing through the guest-host liquid crystal 2 the light having penetrated the color filter 3, by driving the liquid crystal 2 through the matrix electrodes actuated in accordance with the display signals. In this case, a pleochroic color display of arbitary colors can be effected by selecting the color of the color filter.

In this invention, cholesteric liquid crystal is used as host liquid crystal. One feature of this invention is that to cause the cholesteric liquid crystal to disperse light, the surfaces of the substrates touching the liquid crystal should be treated by silicone or lecithin. Moreover, if a blackish dichroic dye is used as guest material, the area other than the patterns to be displayed is masked by black color. Accordingly, a color display having such a high contrast as could not be attained by any conventional liquid crystal display device can be obtained. Also, as apparent from the above description, this embodiment is suitable for positive displays.

The relationship in position between the liquid crystal cell and the color filter of the matrix type color display device according to this invention will be described below. If the electrodes 7 and 7' corresponding to the pattern to be displayed are supplied with a voltage higher than the threshold voltage which is high enough to transform the guest-host liquid crystal 2 from cholesteric to nematic phase, then the cholesteric is turned homeotropic (that is, phase transformation occurs). In this case, the guest material, i.e. dichroic dye, takes the same molecular orientation as the cholesteric host so that the guest material looks colorless. The color filter is so arranged with respect to the liquid crystal cell that the blue portions of the color filter are registered on the homeotropic parts of the liquid crystal caused as above through the energization of the electrodes. With this arrangement, the light from behind the cell passes through the cell and the blue of the filter is visualized according to the patterns of the electrodes energized. This mode of display is filter-dependent and if a color filter consisting of three primary color elements, i.e. red, green and blue elements, is used, any desired color display can be obtained. In such a case, however, a blackish dichroic dye is used as guest added to the cholesteric liquid crystal as host, so as to produce clear positive color display.

The structures of the electrodes are not limited to a matrix one as shown in FIG. 1, but can be in any shape depending on the patterns to be displayed. Also, plural liquid crystal cells may be used if desired.

Moreover, the color filter can have any shape and consist of any color elements, in accordance with the patterns to be displayed.

In the color display system according to this invention, the light source is indispensable for display to be effected, but natural light and a variety of artificial lights can be used as such a light source. Moreover, a light disperse plate can be used.

Now, this invention will be described by way of concrete embodiment.

As shown in FIG. 2, the surfaces of transparent glass substrates 1 and 1' (each having an area of 5 cm×5 cm) having transparent electrodes a, b and a', b' are applied with lecithin to produce a homeotropic orientation of the liquid crystal and a liquid crystal cell with an interelectrode gap of 20 μm is completed. In this case, 5% by weight of 4-(2-methylbutyl)-4'-cyanobiphenyl is added as optically active material to cholesteric liquid crystal (sold under trade name E-7 BDH Co. of British). The cholesteric liquid crystal is used as host material and five kinds of dichroic dyes given below are dissolved as guests into the host material. This guest-host liquid crystal 2 is injected into the cell and the display device is finished by sealing. The guest dyes added are:

| Electrode Energization Table | | | | | | | | |
|---|---|---|---|---|---|---|---|---|
| | Electrodes to be selected | | | | | | | |
| substrate 1 | a | a | b | b | a | a b b | a b a' | a b b |
| substrate 2 | a' | b' | b' | a' | b' | a' b' | a' b' | a' b' |

(1) 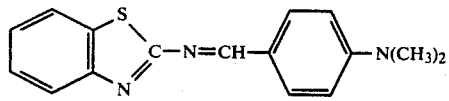 0.33% by weight (2) 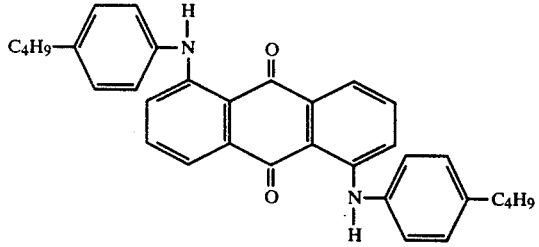 0.33% by weight (3) 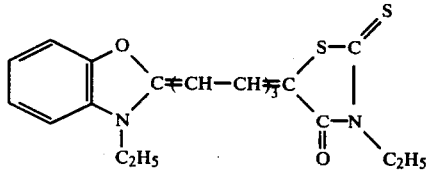 0.13% by weight (4) 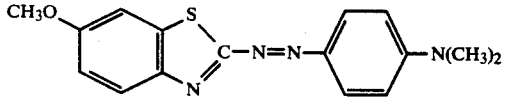 0.11% by weight (5) 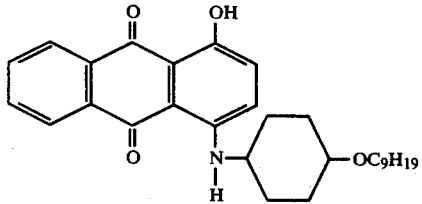 1.67% by weight

| color to be displayed | R | G | B | Y | R G | G B | B Y | Y R | R,G B,Y |

The cholesteric pitch of the above mentioned cholesteric liquid crystal is 1.9 μm. The above dichroic dyes are so mixed to absorb light over wavelengths of 400–700 μm, that is, to produce a blackish tone.

As shown in FIG. 2, a composite color filter 3 given below was attached to the rear surface of the above completed liquid crystal cell. The detail of the composite filter is:
 R: red filter
 G: green filter
 B: blue filter
 Y: yellow filter A fluorescent lamp 4 (10 W) to produce white light was disposed behind the thus completed display cell. The distance between the color filter 3 and the fluorescent lamp 4 was set to be 5 cm so that the liquid crystal might be sufficiently black in the absence of the electric field between the electrodes 7 and 7' even while the fluorescent lamp 4 was lit up. Then, when a voltage of 55 V was applied between the following pairs of electrodes, clear pleochroic display was obtained.

In the above embodiment, if the patterns of the electrodes are made smaller and if the number of colors is increased, then any desired pleochroic color display can be obtained.

This invention finds a wide application to, for example, graphic displays, measuring instruments with colored representations, commercial advertising plates etc.

What we claim is:

1. A transmission-type liquid crystal device for pleochroic color display, adapted to have a light source disposed at the side of said device opposite to the display side of said device, comprising a layer of liquid crystal containing a blackish dichroic dye, said layer being sandwiched between a pair of substrates each having thereon a transparent electrode adjacent to said layer for driving said liquid crystal in response to an external signal and a color filter disposed adjacent to said layer, wherein said color filter is composed of a plurality of color segments and said electrode is composed of a plurality of electrode segments, wherein said color segments and electrode segments are formed correspondingly, whereby a pleochroic color display having a high contrast can be obtained.

2. A transmission-type liquid crystal device as claimed in claim 1, wherein said liquid crystal is a cholesteric liquid crystal.

3. A transmission-type liquid crystal device as claimed in claim 1, wherein said color filter is disposed in rear of said layer of guest-host liquid crystal.

4. A transmission-type liquid crystal device as claimed in claim 1, wherein said blackish dichroic dye is composed of

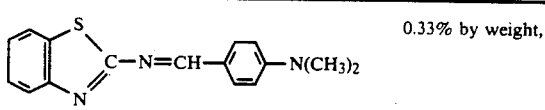  0.33% by weight,

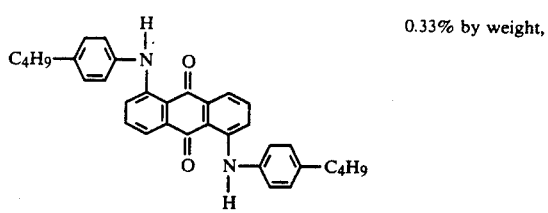  0.33% by weight,

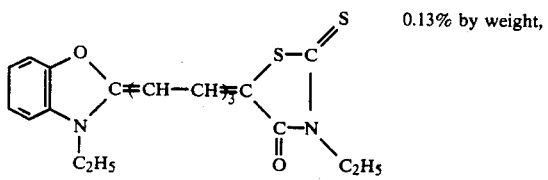  0.13% by weight,

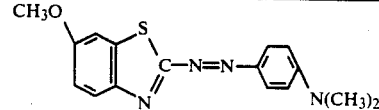  0.11% by weight, and

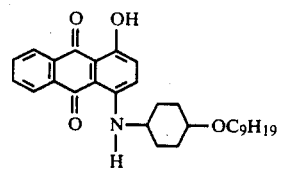  1.67% by weight.

5. A transmission-type liquid crystal device, adapted to have a light source disposed at the side of the device opposite to the display side of the device, comprising: a layer of liquid crystal containing a blackish dichroic dye as a guest, said layer being sandwiched between a pair of transparent substrates each having thereon a transparent electrode adjacent to said layer for driving said liquid crystal in response to an external signal, one of said electrodes being composed of electrode segments which are independently driven by said external signal, and a pleochroic color filter disposed adjacent one of said substrates, said filter being composed of a plurality of color segments each corresponding to each of said electrode segments and each of said color segments being monochroic, whereby a pleochroic color display having a high contrast can be obtained.

6. A transmission-type liquid crystal device as defined in claim 5, wherein said color segments consist of green, blue and red segments and are arranged in order.

7. A transmission-type liquid crystal device as claimed in claim 1 or 5, wherein said blackish dichroic dye absorbs light over wavelengths of 400–700 μm.

8. A transmission-type liquid crystal device as claimed in claim 1 or 5, wherein said blackish dichroic dye is adapted to mask light from said light source passed through said device, whereby a positive color display having a high contrast can be obtained.

* * * * *